Aug. 13, 1957      J. J. OGDEN      2,802,265

DETACHABLE BLADE KNIFE AND BLADES THEREFOR

Filed Sept. 15, 1955

*INVENTOR.*
JOHN J. OGDEN
BY
*Weatherford & Weatherford*
*Attys*

United States Patent Office 2,802,265
Patented Aug. 13, 1957

2,802,265

DETACHABLE BLADE KNIFE AND BLADES THEREFOR

John J. Ogden, Memphis, Tenn.

Application September 15, 1955, Serial No. 534,590

8 Claims. (Cl. 30—339)

This invention relates to detachable blade knives and to blades adapted for detachable connection to a handle. More particularly, this invention relates to knives which are adapted for applications which require a knife having a readily and quickly detachable and attachable blade and yet which require that the blade be securely and firmly held to the handle once the blade has been attached thereto. Such a knife finds particular application as a surgeon's knife in which it is necessary to quickly detach the blade from the handle for the quick replacement by a sterile or by a different size blade. It is obvious that in applications such as this in which precision is required it is necessary to have a knife which is securely attached to the handle against relative movement thereof. It is also obvious that such knives must be able to withstand torsional stresses that are encountered in such applications without relative movement of the handle and knife blade. Heretofore various attempts have been made to provide a knife which has the above mentioned characteristics, that is, quick replaceability of the knife blade and immobility of the blade relative to the handle once it has been attached. None have been completely successful, particularly with regard to their ability to withstand torsional stresses.

It is contemplated in the present invention that a novel and unique manner of attaching the blade to the handle be provided, whereby blades may be quickly and easily replaced and yet after attachment with the handle the blade is securely held against relative movement therewith.

An object of the present invention is to provide a knife consisting of a handle and a blade adapted for engagement against relative movement and accidental removal thereof during use.

A further object is to provide such a knife in which the blade is easily and quickly attachable to and detachable from the handle.

A further object is to provide such a knife having spaced pairs of integral tongues on the knife blade which are adapted to engage portions of the handle for attaching the blade to the handle.

A further object is to provide a blade with such tongues, each pair of which consists of a greater deformed tongue removably engaging the upper surface of the handle, and a lesser deformed tongue removably engaging the lower surface of the handle, said greater deformed tongues and said lesser deformed tongues being respectively diagonally positioned whereby the blade is firmly held against torsional stresses.

A further object is to provide means for latching the blade in fully seated position.

A further object is to generally improve the design and construction of detachable blade knives.

A further object is to improve the design, construction and efficiency of blades for detachable connection to handles.

The means by which the foregoing and other objects of the present invention are accomplished and the manner of their accomplishment will be readily understood from the following specification upon reference to the accompanying drawings, in which:

Fig. 2 is a sectional view taken as on the line II—II of Fig. 1.

Fig. 3 is a sectional view taken as on the line III—III of Fig. 1.

Fig. 4 is a sectional view taken as on line IV—IV of Fig. 1.

Fig. 5 is a fragmentary inverted plan view of the device of Fig. 1.

Fig. 6 is a plan view of the detached blade.

Fig. 7 is a blade elevational view of the detached blade.

Fig. 8 is a fragmentary top plan view of the handle with the blade removed.

Fig. 9 is a fragmentary inverted plan view of the handle with the blade removed.

Figure 1:
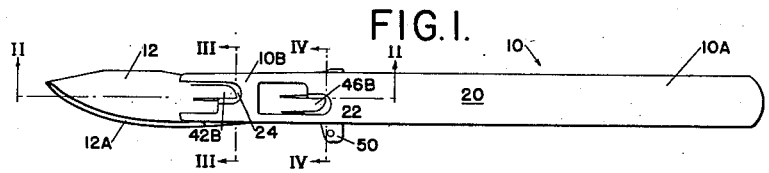
Fig. 1 is a top plan view of the knife with the blade and the handle engaged.
Figure 2:
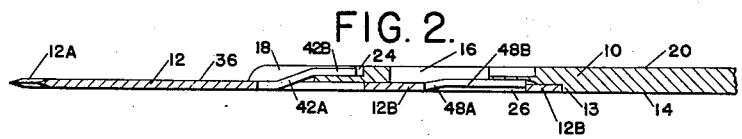
Figs. 2 through 9 are enlarged views.
Figure 3:
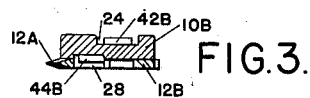
Figure 4:
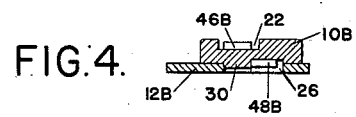
Figure 5:
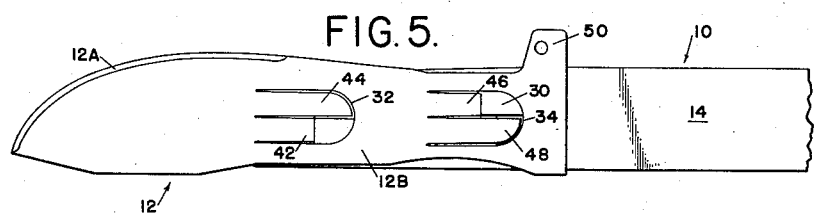
Figure 6:
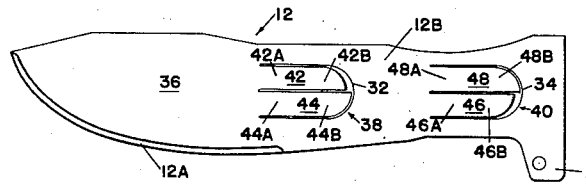

Referring now to the drawings in which the various parts are indicated by numerals, the knife of the present invention consists of a handle 10 and a detachable blade 12. The handle comprises a grip portion 10A and an integral blade engaging shank portion 10B.

Blade engaging shank portion 10B is reduced in thickness relative to the thickness of the grip portion 10A and a shoulder 13 is formed at the juncture of the shank portion and the grip portion on the bottom or blade engaging side 14 of handle 10. Handle shank portion 10B has longitudinally spaced access openings 16 and 18 extending therethrough from the top or back side 20 of handle 10 to blade engaging side 14, the opening 18 being at the end of the handle and preferably though not necessarily open at the end of the handle. Back side 20 is grooved to provide seats 22 and 24 which respectively extend longitudinally from access openings 16 and 18 towards grip portion 10A. Seats 22 and 24 are disposed diagonally with respect to the longitudinal center-line of handle 10. The width of each of seats 22 and 24 is preferably equal to substantially one half the width of each of access openings 16 and 18. The blade engaging side 14 is grooved to provide shallow flat bottom grooves 26 and 28 which extend longitudinally from access openings 16 and 18 respectively toward grip portion 10A. Grooves 26 and 28 are disposed diagonally with respect to the longitudinal center line of handle 10, groove 26 being adjacent seat 22 and groove 28 being adjacent seat 24, the diagonal disposition of the grooves being opposite to the diagonal disposition of the seats. The width of each of grooves 26 and 28 is preferably equal to substantially half the width of each of access openings 16 and 18.

From the foregoing it is apparent that extending from each of access openings 16 and 18 is a seat on one side of shank portion 10B and a groove on the other side of the shank portion, and it is apparent that the seats and grooves extending from the respective access openings are oppositely positioned with respect to the longitudinal center-line. Adjacent one of the grooves 26 and 28, preferably adjacent groove 26, is a lug 30 integrally formed with and projecting from the blade engaging side 14 of shank portion 10B.

Figure 7:
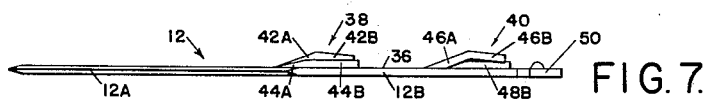
Figure 8:
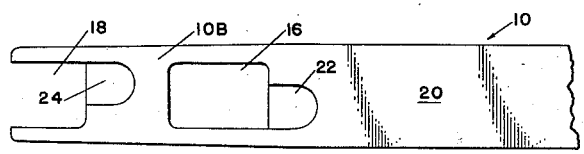
Figure 10:
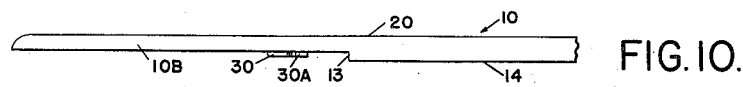
Fig. 10 is a fragmentary side view of the handle.
Figure 9:
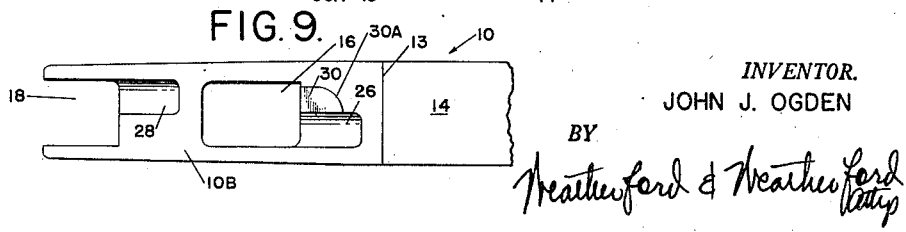

The blade 12 is preferably made of thin sheet metal, as for example surgical steel, having a slight amount of flexibility and is provided with a cutting edge 12A along one of its edges and end. Spaced U-shaped cuts 32, 34 are made in the shank portion 12B of blade 12, with the U's preferably opening forwardly toward the tip of the blade and with the spacing between the cuts corresponding to the spacing between access openings 16 and 18. Each of the portions thus cut out are longitudinally split and forced away from the handle engaging face 36 of the blade to form two pairs 38, 40, of longitudinally spaced resilient tongues. One of the tongues in forward pair 38 is deformed more from the face 36 than the other of the pair whereby the forward pair comprises a greater deformed tongue 42 and a lesser deformed tongue 44 adjacent thereto. Similarly one of the rearward pair of tongues is deformed more from the face 36 than the other of the tongues whereby the rearward pair comprises a greater deformed tongue 46 and a lesser deformed tongue 48 adjacent thereto. Greater deformed tongues 42, 46 respectively comprise upwardly angled portions 42A, 46A and integral end portions 42B, 46B. Similarly, lesser deformed tongues 44, 48 respectively comprise upwardly angled portions 44A, 48A, and integral end portions 44B, 48B. End portions 42B, 46B preferably slightly converge towards handle engaging face 36 when in the blade detached position, as best illustrated in Fig. 7.

Greater deformed tongues 42 and 46 are diagonally disposed relative to the longitudinal center line of blade 12 and lesser deformed tongues 44 and 48 are oppositely diagonally disposed relative to the longitudinal center-line of the blade.

An integral and laterally extending disengaging ear 50 may be provided adjacent the rearward end of blade 12.

To engage the blade 12 with the handle 10 the end portions 42B and 46B of the greater deformed tongues are engaged with the seats 24 and 22 respectively and the end portions 44B and 48B of the lesser deformed tongues are engaged with the flat bottom grooves 28 and 26 respectively, with the face 36 of blade 12 seated on the blade engaging side 14 of shank 12B. Blade 12 is then moved endwise towards grip portion 10A. The movement is continued until the bight of rearward U-shaped cut 34 rides over and seats around lug 30 to lock blade 12 in blade attached position against longitudinal movement away from handle 10. It will be understood that lug 30 is rounded on one of its edges as at 30A to correspond to the curve of the engaged portion of the bight of U-shaped cut 34. Also it will be understood shoulder 13 will limit longitudinal movement of blade 12 relative to handle 10 in a direction opposite from that limited by lug 30.

The distance between the bottom of each of seats 22, 24 and the blade engaging side 14 of shank portion 10B is greater than the distance between the lower surface of each of end portions 42B, 46B and face 36 when in the blade detached position, whereby end portions 42B, 46B will be forced in a direction away from face 36 preferably to a position substantially parallel with face 36 when brought into blade attached position. Thus resilient tongues 42, 46 will clampingly hold blade 12 against handle 10. The distance between the upper surface of end portions 44B, 48B and face 36 when in the blade detached position is preferably slightly greater than the distance between the bottom of grooves 26, 28 and side 14 of shank portion 10B whereby in blade attached position end portions 44B, 48B will be forced towards face 36. Thus end portions 44B, 48B will be respectively urged against the bottom of grooves 28, 26 when in blade attached position.

From the foregoing it will be understood that in the assembled position blade 12 is firmly attached to the handle 10, relative longitudinal movement being prevented by shoulder 13 and lug 30, flatwise separating movement of the blade away from the handle being prevented by the greater deformed tongues 42 and 46 holding the blade securely against shank 12B and torsional movements of the blade relative to the handle being prevented by the diagonal disposition of greater deformed tongues 42, 46, and lesser deformed tongues 44, 48.

To disengage blade 12, the disengaging ear 50 is pushed away from the blade engaging side 14 of the handle raising the bight of the U-shaped cut 34 free of the lug 30, and the blade is pushed lengthwise along handle shank 10B until the tongues 42, 46, 44, 48 are free of the seats 24, 22 and the grooves 28, 26, whereby the blade will drop freely from the handle. Thus it will be understood the blade 12 may be quickly and easily detached from handle 10 in one quick movement.

I claim:

1. A detachable blade knife including a handle and a blade having a handle engaging side, said blade having pairs of longitudinally spaced resilient tongues integral with and deformed from the handle engaging side thereof, each of said pairs consisting of a greater deformed tongue and a lesser deformed tongue adjacent thereto, said greater deformed tongues being diagonally disposed relative to the longitudinal center-line of said blade and said lesser deformed tongues being oppositely diagonally disposed relative to said longitudinal center-line, said handle including a grip portion and an integral shank portion, said shank portion being cut-out to form openings spaced longitudinally in conformity with the spacing of said pairs of tongues, said shank portion having a blade engaging side and a back side, said shank being grooved on said back side to provide a pair of seats respectively extending towards said grip portion from said openings, said seats being disposed in conformity with the diagonal disposition of said greater deformed tongues, said shank being grooved on said blade engaging side to provide a pair of flat bottom grooves extending from said openings, said grooves being disposed in conformity with the opposite diagonal disposition of said lesser deformed tongues, said greater deformed tongues respectively extending through said openings and clampingly engaging the back side of said shank portion in said seats and said lesser deformed tongues respectively engaging the blade engaging side of said shank portion in said grooves whereby the handle engaging side of said blade is held in face-to-face engagement with the blade engaging side of said shank portion against torsional stresses, said blade being cut-out to form a U-shaped cut, a stud integrally formed with said shank portion and projecting from the blade engaging side thereof, said U-shaped cut embracingly engaging said stud whereby said blade is limited in longitudinal movement relative to said handle.

2. A detachable blade knife including a handle and a blade having a handle engaging side, said blade having pairs of longitudinally spaced resilient tongues integral with and deformed from the handle engaging side thereof, each of said pairs consisting of a greater deformed tongue and a lesser deformed tongue adjacent thereto, said greater deformed tongues being diagonally disposed relative to the longitudinal centerline of said blade and said lesser deformed tongues being oppositely diagonally disposed relative to said longitudinal center-line, said handle including a grip portion and an integral shank portion, said shank portion being cut-out to form openings spaced longitudinally in conformity with the spacing of said pairs of tongues, said shank portion having a blade engaging side and a back side, said shank being grooved on said back side to provide a pair of seats respectively extending towards said grip portion from said openings, said seats being disposed in conformity with the diagonal disposition of said greater deformed tongues, said shank being grooved on said blade engaging side to provide a pair of flat bottom grooves extending from said openings, said grooves being disposed in conformity with the opposite diagonal disposition of said lesser deformed tongues, said greater deformed tongues respectively extending through said openings and clampingly engaging the back side of said shank portion in said seats and said lesser deformed tongues respectively engaging the blade engaging side of said shank portion in said grooves whereby the handle engaging side of said blade is held in face-to-face engagement with the blade engaging side of said shank portion against torsional stresses, and latching means interconnecting said blade and said handle for limiting relative longitudinal movement therebetween.

3. A detachable blade knife including a handle and a blade having a handle engaging side, said blade having pairs of longitudinally spaced resilient tongues integral with and deformed from the handle engaging side thereof, each of said pairs consisting of a greater deformed tongue and a lesser deformed tongue adjacent thereto, said greater deformed tongues being diagonally disposed relative to the longitudinal centerline of said blade and said lesser deformed tongues being oppositely diagonally disposed relative to said longitudinal center-line, said handle including a grip portion and an intergral shank portion, said shank portion being cut-out to form openings spaced longitudinally in conformity with the spacing of said pairs of tongues, said shank portion having a blade engaging side and a back side, said greater deformed tongues respectively extending through said openings and clampingly engaging the back side of said shank portion and said lesser deformed tongues respectively engaging the blade engaging side of said shank portion whereby the handle engaging side of said blade is held in face-to-face engagement with the blade engaging side of said shank portion against torsional stresses, said blade being cut-out to form a U-shaped cut, a stud integrally formed with said shank portion and projecting from the blade engaging side thereof, said U-shaped cut embracingly engaging said stud whereby said blade is limited in longitudinal movement relative to said handle.

4. A detachable blade knife including a handle and a blade, spaced pairs of resilient tongues respectively connected at one of their ends to said blade and the other of their ends deformed from one side of said blade, each of said pairs consisting of a greater deformed tongue and a lesser deformed tongue adjacent thereto, said greater deformed tongues being diagonally disposed relative to the longitudinal center-line of said blade and said lesser deformed tongues being oppositely diagonally disposed relative to said longitudinal center-line, said handle being cut-out to form openings spaced in conformity with the spacing of said pairs of tongues, said greater deformed tongues respectively extending through said openings and clampingly engaging one side of said handle and said lesser deformed tongues respectively engaging the other side of said handle whereby said blade is held in face-to-face engagement with said handle against torsional stresses.

5. A detachable blade knife including a handle and a blade, a pair of resilient tongues respectively connected at one of their ends to said blade and the other of their ends being deformed from one side of said blade, one of said pair being deformed more than the other of said pair, said tongues being disposed in side-by-side relationship on opposite sides of the longitudinal center-line of said blade, said handle being cut-out to form an opening therethrough, said greater deformed tongue extending through said opening and clampingly engaging one side of said handle and said lesser deformed tongue engaging the other side of said handle whereby said blade is held in face-to-face engagement with said handle against torsional stresses, and latching means interconnecting said blade and said handle for limiting relative longitudinal movement therebetween.

6. A sharpened blade adapted for detachable connection to a handle, longitudinally spaced pairs of resilient tongues integral with said blade and deformed from one face of said blade, each of said pairs consisting of a greater deformed tongue and a lesser deformed tongue adjacent thereto, said greater deformed tongues being diagonally disposed relative to the longitudinal center-line of said blade and said lesser deformed tongues being oppositely diagonally disposed relative to said longitudinal center-line, each of said tongues including a distal end portion, the distance of the end portions of said greater deformed tongues from said one face being greater than the distance of the end portions of said lesser deformed tongues from said one face whereby said tongues may engage a handle to detachably connect said blade to a handle.

7. A sharpened blade adapted for detachable connection to a handle, longitudinally spaced pairs of resilient tongues integral with said blade and deformed from one face of said blade, each of said pairs consisting of a greater deformed tongue and a lesser deformed tongue adjacent thereto, said greater deformed tongues being diagonally disposed relative to the longitudinal center-line of said blade and said lesser deformed tongues being oppositely diagonally disposed relative to said longitudinal center-line, each of said tongues including an end portion and an upwardly angled portion, said end portions being integrally connected to said blade by said angled portions, said end portions being spaced from the face of said blade, the end portions of the greater deformed tongues being spaced at a greater distance from said blade than said lesser deformed tongues, the end portions of said greater deformed tongues converging from said angled portions toward the face of said blade whereby the end portions of said tongues are adapted to engage a handle to detachably connect the blade to the handle.

8. A sharpened blade adapted for detachable connection to a handle, a pair of resilient tongues integral with said blade and deformed from said blade, said pair consisting of a greater deformed tongue and a lesser deformed tongue, said tongues being disposed in side-by-side relationship on opposite sides of the longitudinal center-line of said blade, each of said tongues including a distal end portion, the distance of the end portion of said greater deformed tongue from said blade being greater than the distance of the end portion of said lesser deformed tongue from said blade whereby said tongues may engage a handle to detachably connect said blade to the handle.

References Cited in the file of this patent
UNITED STATES PATENTS

| | | |
|---|---|---|
| 1,088,183 | Sheehan | Feb. 24, 1914 |
| 1,186,480 | Jones | June 6, 1916 |
| 1,791,855 | Taylor | Feb. 10, 1931 |

FOREIGN PATENTS

| | | |
|---|---|---|
| 243,732 | Switzerland | Feb. 1, 1947 |